United States Patent
Kunc et al.

(10) Patent No.: US 9,235,736 B2
(45) Date of Patent: Jan. 12, 2016

(54) METHOD OF COMMUNICATION OF AN ACTIVE SMART RFID LABEL WITH A USER INTERROGATOR AND A PROFESSIONAL INTERROGATOR

(75) Inventors: Vinko Kunc, Ljubljana (SI); Andrej Vodopivec, Ljubljana (SI)

(73) Assignee: AMS INTERNATIONAL AG, Rapperswil (CH)

( * ) Notice: Subject to any disclaimer, the term of this patent is extended or adjusted under 35 U.S.C. 154(b) by 692 days.

(21) Appl. No.: 13/382,372

(22) PCT Filed: Jul. 5, 2010

(86) PCT No.: PCT/SI2010/000040
§ 371 (c)(1),
(2), (4) Date: Jan. 5, 2012

(87) PCT Pub. No.: WO2011/005227
PCT Pub. Date: Jan. 13, 2011

(65) Prior Publication Data
US 2012/0112888 A1 May 10, 2012

(30) Foreign Application Priority Data
Jul. 6, 2009 (SI) .................... P-200900182

(51) Int. Cl.
*H04Q 5/22* (2006.01)
*G06K 7/00* (2006.01)
*G06K 17/00* (2006.01)
*G06K 19/07* (2006.01)

(52) U.S. Cl.
CPC .......... *G06K 7/0008* (2013.01); *G06K 17/0022* (2013.01); *G06K 19/0717* (2013.01); *G06K 19/0723* (2013.01)

(58) Field of Classification Search
CPC ..... G06K 7/00; G06K 7/0004; G06K 7/0008; G06K 19/00; G06K 19/06; G06K 19/067; G06K 19/0677; G06K 19/07; G06K 19/0701; G06K 19/0702; G06K 19/0703; G06K 19/0716; G06K 19/0717; G06K 19/0723; G06Q 20/00; G06Q 20/20; G06Q 20/201; G06Q 20/204; G06Q 20/30; G06Q 20/32; G06Q 20/327; G06Q 20/3278
USPC .......... 340/10.1–10.6, 572.1–572.9; 455/403, 455/41.1, 418, 419, 73, 552.1; 379/55.1; 235/375–386; 705/22, 28
See application file for complete search history.

(56) References Cited

U.S. PATENT DOCUMENTS

| | | | |
|---|---|---|---|
| 7,148,803 B2 | 12/2006 | Bandy et al. | |
| 7,250,863 B2* | 7/2007 | Nemoto et al. | 340/572.1 |
| 7,271,719 B2* | 9/2007 | Ku et al. | 340/539.26 |
| 7,512,236 B1* | 3/2009 | Zhu | G06Q 20/027 380/255 |
| 7,962,369 B2* | 6/2011 | Rosenberg | 705/26.1 |
| 8,198,985 B2* | 6/2012 | Tiernay | G06K 19/0707 340/10.3 |
| 8,494,908 B2* | 7/2013 | Herwig et al. | 705/16 |
| 8,610,565 B2* | 12/2013 | Park | G06K 19/0717 340/10.41 |
| 2005/0088299 A1 | 4/2005 | Bandy et al. | |
| 2006/0200480 A1 | 9/2006 | Harris et al. | |
| 2007/0254674 A1* | 11/2007 | Pedigo | G01S 1/68 455/456.2 |
| 2007/0275735 A1* | 11/2007 | Estevez | G01C 21/20 455/457 |
| 2008/0136599 A1* | 6/2008 | Sugano et al. | 340/10.1 |
| 2008/0157924 A1* | 7/2008 | Batra | 340/10.1 |
| 2009/0072951 A1 | 3/2009 | Alberth, Jr. et al. | |
| 2009/0088077 A1* | 4/2009 | Brown et al. | 455/41.2 |
| 2009/0201136 A1* | 8/2009 | Itagaki | G06Q 10/087 340/10.52 |
| 2010/0051692 A1* | 3/2010 | Knudson | H05K 9/0067 235/439 |

FOREIGN PATENT DOCUMENTS

| | | |
|---|---|---|
| CN | 1906642 | 1/2007 |
| CN | 101147051 A | 3/2008 |
| DE | 19955120 A1 | 5/2001 |
| WO | WO-2008/065649 A2 | 6/2008 |

* cited by examiner

*Primary Examiner* — Steven Lim
*Assistant Examiner* — Ryan Sherwin
(74) *Attorney, Agent, or Firm* — McDermott Will & Emery LLP

(57) ABSTRACT

A method of communication of an active smart RFID label with a user interrogator and a professional interrogator, said professional interrogator enabling a service provider to fully control said active smart RFID label and by means of which interrogator a content and a form of an extract of data, which are collected by a sensor, which is comprised of in the label, as well as a location within the label as location of said extract of data being collected by said label sensor, said location being accessible by the user interrogator are determined.

A service user gets concisely acquainted with the service provided by the label by means of a widely used interrogator, whereat he cannot influence the data contained in the label or even its functioning neither needs any additional knowledge to communicate with said label.

7 Claims, No Drawings

METHOD OF COMMUNICATION OF AN ACTIVE SMART RFID LABEL WITH A USER INTERROGATOR AND A PROFESSIONAL INTERROGATOR

This is a national stage of PCT/SI10/000040 filed Jul. 5, 2010 and published in English, which claims the priority of Slovenia number P-200900182 filed Jul. 6, 2009, hereby incorporated by reference.

The invention relates to a method, according to which an active smart RFID label provided with one or several sensors communicates both with a user interrogator, which enables a service user to read important data from said label, and with a professional interrogator, which enables a service provider to fully control said label.

On the one hand, an active smart RFID label (ASL) has been already accepted in practice. Besides an RFID communication module, the active smart RFID label comprises one or several sensors too and is provided with a battery. It carries out measurements and stores measurement results.

The active smart RFID label communicates with a selected RFID protocol in the low-frequency range (125 kHz), in the high-frequency range (13.56 MHz) or in the range of very high frequencies (UHF, about 900 MHz). However, said label can also establish contact communication, namely with a standardized serial data communication protocol.

A provider providing a service to a user by means of an active smart RFID label is fully authorized, i.e. has full control of such label, to activate or deactivate it, he can access all data therein, can load data therein and set parameters of its operation.

To this end the service provider needs a professional interrogator supporting said selected RFID protocol and being provided with a proprietary software. The proprietary software makes it possible to use commands being specific for a given active smart RFID label. The commands may be password protected.

The active smart RFID label is often used for tracking a way, in which transport and storage of a perishable product are carried out, by measuring the temperature of said product in prescribed time intervals. To this end, the active smart RFID label attached to said product is provided with a temperature sensor.

A consignee of the product at an end sales point is furnished with a professional interrogator and can therefore check, whether said product was handled properly. But such method is defective in that a purchaser of said product as its user cannot make any check of the product.

On the other hand NFC technology is subject to a rapid development. A portable telephone is provided with a proprietary module and a proprietary service in a way that a user can make use of an NFC telephone as NFC interrogator of the active smart RFID label.

A Near Field Communication Forum has laid down four types of the NFC labels of said kind. It has determined a physical communication level based on some existing RFID protocol. Most commonly it is the protocol ISO 14443A. It has also determined a location of data within said label, i.e. addresses of locations with data.

However, it also determined an application code as an address, where a user will obtain an instruction how to interpret data from said label.

The application for a specified code is already present on the portable telephone; otherwise the user can acquire it by means of a mobile connection or from the internet.

All data contained in said location within the active smart RFID label are therefore accessible to any user of a portable telephone, which is provided with an NFC circuit and whose provider supports a specific application of said label.

A wireless communication device is known (US 2009/0072951 A1) that comprises a near-field activated circuit and a sensor. An interrogator comprises a near-field activating circuit and is capable of entering information into said near-field activated circuit. U.S. Pat. No. 7,148,803 B2 discloses a reader implemented in a portable telephone and communicating with radio-frequency addressable sensors combining RFID label functionality and sensor functionality. The reader initializes and powers the sensors.

In both said disclosures the NFC portable telephone is the main reader device or is equivalent thereto and it can even intervene into a sensor circuit. The NFC portable telephone reads data as acquired by the sensor and forwards them further across a telecommunication network.

The technical problem of the invention is to propose a method of communication of an active smart RFID label that will be organized in a way that a service user will have an access to data on said service, which are important to him, and that, when establishing the connection, said active smart RFID label will recognize whether a service provider or the service user communicates with it.

Said technical problem is solved by the method of the invention for communication of an active smart RFID label with a user interrogator and a professional interrogator as characterized by the features of the characterizing portion of the first claim, and dependent claims characterize the variants of its embodiment.

The method of the invention of communication of an active smart RFID label with a user interrogator and a professional interrogator enables a service user or a purchaser of a product to concisely acquaint himself with the service and to acquire key characteristic data on usability of the product by means of a widely available and widely used user interrogator, e.g. an NFC portable telephone, whereat no service user or no purchaser of the product can influence the data contained in the active smart RFID label or even its functioning and the service user needs no additional knowledge to communicate with said label.

The invention will now be explained in more detail by way of the description of an embodiment and its variants.

A service provider or a seller of a product is fully authorized to communicate with an active smart RFID label according to a method of the invention just as he communicated so far by means of a professional interrogator being preferably an RFID interrogator.

The professional interrogator enables the service provider or the seller of a product to fully control the active smart RFID label. Thus the service provider or the seller can in a known way access all data contained in said label, enter data into it and set parameters of its operation.

By the invention, however, it is proposed that the service provider or the seller of the product by means of the professional interrogator determines a content and a form of an abstract of data collected by a label sensor.

It is further proposed by the invention that, by means of the professional interrogator, a location within the active smart RFID label, which location can be accessed by a user interrogator, is determined as the location, where the abstract of data collected by the label sensor should be entered.

By the represented method of the invention it is achieved that the service user by means of his user interrogator, preferably one as possessed by an ordinary user, nowadays e.g. an NFC portable telephone, can access said abstract of data collected by the label sensor. Thus the organization pattern of the system has been changed by the invention.

Said abstract of data collected by the label sensor is implemented in a way that important data to inform the service user at the moment are displayed in an easily comprehensible way. If necessary, the abstract can also include all data collected by the label sensor, which data are normally always stored within the label, however, at another location.

The service user acquires a software concerned with the interpretation of data read out from a telephone network administrator or by accessing the internet.

The service user uses a user interrogator, which nowadays is a portable telephone provided with a NFC module.

The user interrogator may also be a personal digital assistant, which the user has received from the service provider to make use of it, as a guest in a hotel reception, for example The NFC portable telephone as user interrogator operates at a frequency of 13.56 MHz. The method of the invention may also be carried out by means of the user interrogator operating in the UHF frequency range.

According to the method of the invention the active smart RFID label is confronted with a coexistence of two ways of communication.

In a first—professional—way, said active smart RFID label communicates with the professional interrogator of the service provider on the one hand and, in a second—user—way, it communicates with the user interrogator of the service user on the other hand.

The first way of communication is superordinate to the second way of communication and uses all operational capabilities of the applied active smart RFID label type. In the first way of communication, the service provider determines how the active smart RFID label will operate in the second way of communication, hence he also determines how the data collected by the label sensor must be condensed and organized to be displayed in the second way of communication.

The active smart RFID label introduces itself to the NFC portable telephone, being the user interrogator, in the second way of communication as an NFC label and thereafter it behaves in said way.

The first way of communication renders a possibility of full control over the active smart RFID label and full access to all data, whereas the second way of communication does not render a possibility of full control over said label and renders possible just an access to the condensed form of data collected by the label sensor.

The second way of communication is thus actually intended for displaying selected or allowed data collected by the label sensor to assist a wide usership with choosing a service or a product.

When communicating the active smart RFID label recognizes an interrogator as a user interrogator or a professional interrogator of the service provider by an RFID protocol used by said interrogator. This is the case when said protocols are different.

However, the active smart RFID label recognizes an interrogator that established a contact communication with it as a professional interrogator. A contact connection, i.e. a wire connection, uses the standardized serial communication protocol SPI or I2C. A former functionality of the RFID communication is now doubled or it is transferred to either of the previously mentioned contact communication protocols.

The active smart RFID label recognizes an interrogator as a user interrogator or a professional interrogator by a command received from said interrogator after an initial connection has been established. Namely, said label and interrogator first employ an anticollision protocol so that the interrogator acquires a unique identification number from the label. If several labels are present, the interrogator then only communicates with said label.

The active smart RFID label can also recognize an interrogator as a user interrogator or professional interrogator by a frequency, at which said interrogator signals.

According to the invention the professional interrogator determines a location within said active smart RFID label, into which location the service user can enter his demand. The service provider reads the user's demand by means of the professional interrogator and enters his decision on the user's demand into said active smart RFID label.

The service provider can determine a location within said active smart RFID label by means of the professional interrogator, into which location the service user can enter data relevant to him.

The continuation will present an embodiment of the method according to the invention of communication of the active smart RFID label with the user interrogator and the professional interrogator.

In the first way of communication the unique identification number is determined by means of the professional interrogator, which unique identification number pertains to the active smart RFID label in the second way of communication. An application code is also entered.

In the first way of communication an organization pattern of data collected by the sensor is then determined as they should be seen in the second way of communication.

Only data important to the purchaser of the product should be entered into the abstract: production date, producer, status of the product with respect to its previous handling—i.e. was the product handled with as prescribed for it or not; its highest temperature and the lowest one—as well as the best-before date. But no details will be displayed, like a way of logging temperature, not all logged data, a way of calculating a guarantee period and coefficients pertinent thereto.

Further, in the first way of communication the locations foreseen for entering in the second way of communication are determined.

Out from the active smart RFID label organized as described, the user can obtain just basic data to find out whether the product is faultless and according to his wishes but he cannot influence the label operation.

The invention claimed is:

1. A method of communication of an active smart radio-frequency identification (RFID) label with a user interrogator being a portable telephone provided with a near field communications (NFC) module and a professional interrogator, said professional interrogator enabling a service provider to fully control said active smart RFID label in that said professional interrogator can access all data therein, load data into said smart RFID label and set parameters of said smart RFID label's operation, the method:

characterized in that the professional interrogator determines a content and a form of an extract of data, which are collected by a sensor, the sensor being comprised by the active smart RFID label, characterized in that the professional interrogator determines a location within the active smart RFID label, which location is accessible by the user interrogator, as the location where said extract of data being collected by said label sensor should be entered, characterized in that the user interrogator has access to the extract of data and cannot fully control the active smart RFID label, and characterized in that said active smart RFID label determines the type of a first interrogator as being a user interrogator or professional interrogator depending on an RFID protocol used by said first interrogator, whereat the first interrogator, which established a contact communication with the smart RFID label, is recognized as user interrogator or as professional interrogator, depending on a command received from said first interrogator or depending on a frequency of a signal, which said first interrogator uses for communication with said smart RFID label.

2. The method as recited in claim 1, characterized in that the user interrogator operates at a frequency of 13.56 MHz.

3. The method as recited in claim 1, characterized in that the user interrogator operates in the ultra high frequency (UHF) frequency range.

4. The method as recited in claim 1, characterized in that the professional interrogator determines a location in said active smart RFID label, into which a user can enter a demand.

5. The method as recited in claim 4, characterized in that the service provider reads a user's demand by means of the professional interrogator and enters a decision on the user's demand into said active smart RFID label.

6. The method according to claim 1, characterized in that the professional interrogator determines a location within said active smart RFID label, into which location a user can enter data.

7. The method as recited in claim 1, wherein the user interrogator cannot access all data stored in the active smart RFID label.

* * * * *